United States Patent
Xiong

(10) Patent No.: US 7,103,321 B2
(45) Date of Patent: Sep. 5, 2006

(54) POWER AMPLIFIER BYPASS IN A HALF-DUPLEX IC

(75) Inventor: Wei Xiong, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 487 days.

(21) Appl. No.: 10/649,081

(22) Filed: Aug. 26, 2003

(65) Prior Publication Data

US 2004/0043731 A1 Mar. 4, 2004

Related U.S. Application Data

(60) Provisional application No. 60/407,409, filed on Aug. 30, 2002.

(51) Int. Cl.
*H04B 1/44* (2006.01)

(52) U.S. Cl. .......................... 455/78; 455/73

(58) Field of Classification Search ............ 455/78, 455/73, 84, 79, 296, 67.14, 574, 82, 127.3, 455/127.1; 375/221, 219; 370/296
See application file for complete search history.

(56) References Cited

U.S. PATENT DOCUMENTS

| 5,909,643 | A | * | 6/1999 | Aihara | 455/127.3 |
| 6,047,178 | A | * | 4/2000 | Frlan | 455/423 |
| 6,397,090 | B1 | * | 5/2002 | Cho | 455/574 |
| 6,591,087 | B1 | * | 7/2003 | Oda | 455/78 |
| 2004/0077316 | A1 | * | 4/2004 | Xiong | 455/78 |
| 2004/0137854 | A1 | * | 7/2004 | Ge | 455/78 |
| 2004/0198237 | A1 | * | 10/2004 | Abutaleb et al. | 455/78 |

* cited by examiner

*Primary Examiner*—Matthew D. Anderson
*Assistant Examiner*—Lewis West
(74) *Attorney, Agent, or Firm*—Philip Wadsworth; Charles D. Brown; Howard H. Seo

(57) ABSTRACT

A communication device having a structure that utilizes a minimum number of switches to bypass a power amplifier in the communication device is disclosed. The communication device takes advantage of the half-duplex operation of the RF transmitter and receiver in the communication device to minimize the number of switches required to bypass a power amplifier in the communication device.

36 Claims, 3 Drawing Sheets

POWER AMPLIFIER BYPASS IN A HALF-DUPLEX IC

RELATED APPLICATION

This application claims priority to U.S. Provisional Application Ser. No. 60/407,409 filed Aug. 30, 2002.

BACKGROUND

The present invention generally relates to wireless communication devices and, more particularly, to bypassing a power amplifier in a wireless communication device communicating with an access point in a local area network (LAN).

Wireless communication devices, for example devices using radio frequency signal transmission, generally must comply with regulations limiting, for example, the radio frequency emissions, transmit power, and mode of operation of the devices. Such regulations may be enforced by the Federal Communications Commission (FCC) in the United States, for example, or in Europe by the European Telecommunications Standards Institute (ETSI). Wireless LAN communication networks are subject, for example, to the IEEE 802.11 standard, which includes, for example, 802.11a, 802.11b, and 802.11g standards. The 802.11b standard limits transmit power for wireless LAN communication devices in the United States to 30 decibels relative to one milliwatt (dBm), in Europe, to 20 dBm, and in Japan, to 10 dBm per megaHertz (dBm/MHz). Such wireless LAN communication devices may be described as stations or access points. Stations typically may be found in laptop computers, cell phones, portable modems, or personal digital assistants (PDAs), where they are used for communication with a wired LAN through an access point, which may be generally described as a wireless transmitter/receiver connected into the wired LAN for interfacing the wired LAN to the wireless communication devices. Stations may also communicate with other stations in a peer-to-peer network, without the presence of an access point, described in the IEEE 802.11a, 802.11b or 802.11g standard as "ad-hoc" mode.

The 802.11 standard specifies a half-duplex mode of operation for wireless transmitter-receivers, also commonly referred to as "transceivers", included in wireless LAN communication devices. Half-duplex operation is characterized by the transceiver, at any given time, either transmitting a signal or receiving a signal, but not both. Half-duplex operation is distinguished from full-duplex operation in which the transceiver may simultaneously transmit one signal while receiving a second signal. Half-duplex operation typically requires control by the communication device as to whether the transmitter or the receiver is either operating or has an access to the communication channel. As illustrated by FIG. 1, for example, the control over access to the communication channel may be accomplished by switching the connection of the antenna of the wireless communication device between the receiver and the transmitter of the device.

FIG. 1 shows an example of a wireless LAN communication device 100 developed in accordance with the IEEE 802.11a, 802.11b or 802.11g standard. The communication device 100 includes an antenna 101 for receiving and transmitting signals. The antenna 101 is connected to an RF filter 103 for filtering jammer signals. The RF filter 103 is coupled to a switch 104 that switches between signal paths 104a and 104b. The switch 104 selects the signal path 104a when the communication device 100 is receiving a signal. The received signal is propagated from the switch 104 to a low noise amplifier (LNA) 106 that amplifies the received signal. The output signal of the LNA 106 is processed by an RF receiver 109. The processed signal is transmitted to a modem 111. An RF transceiver chip 112 contains the LNA 106, the RF receiver 109, a power amplifier 107, a switch 108 and an RF transmitter 110.

On the other hand, when the communication device 100 transmits a signal, the switch 104 switches to the signal path 104b that is connected to a switch 105. The switch 105 works in conjunction with the switch 108 to bypass the power amplifier 107 when the communication device 100 is transmitting a signal. When the communication device 100 is transmitting a signal, a signal from the RF transmitter 110 is received by the switch 108, and the switch 108 switches to a signal path 105a if the power amplifier 107 is bypassed but switches to a signal path 107a if the signal from the RF transmitter 110 needs to be amplified by the power amplifier 107. The output of the power amplifier 107 is connected to the signal path 105b. In certain situations, the power amplifier 107 needs to be bypassed because the amplification by the power amplifier 107 may create a signal that interferes with other signals due to the strength of the signal. Such situations may occur if the communication device 100 is close to an access point or a base station. In other situations, the power amplifier 107 is bypassed to conserve battery power.

If the signal from the RF transmitter 110 needs to be amplified, the switch 108 switches to the signal path 107a, and the power amplifier 107 receives the signal and amplifies the signal. The amplified signal is received by the switch 105 through the signal path 105b.

Since the switch 105 may receive and propagate an amplified signal to the switch 104, the switch 105 must meet certain strict linearity requirements or the amplified signal will become distorted by the switch 105. In order to meet such strict linearity requirement, the switch 105 cannot be integrated into the RF transceiver chip 112 because the switch 105 may require different fabrication process (such as a GaAs process as opposed to the SiGe process used for the RF tranceiver chip 112). Since the switch 105 is external to the RF transceiver chip 112 and requires a different fabrication process from the RF transceiver 112, the fabrication of the switch 105 incurs extra costs and extra board space.

SUMMARY

This disclosure is directed to a communication device having a structure that utilizes a minimum number of switches to bypass a power amplifier in the communication device.

In one embodiment, a communication device takes advantage of the half-duplex operation of the communication device to minimize the number of switches required to bypass a power amplifier in the communication device. The communication device bypasses the power amplifier while transmitting a signal by using a switch coupled to the power amplifier to direct the signal to a receiver path instead of a transmitter path. Since the receiver path is not used while transmitting a signal, the signal is able to bypass the power amplifier without being corrupted. The signal is then directed to a switch located outside of an RF transceiver in the communication device. The switch located outside of the RF transceiver then directs the signal to an antenna for transmission.

Various embodiments may be implemented in a communication device in software, hardware, firmware, or any combination thereof. If implemented in software, the techniques may be embodied in a computer readable medium comprising instructions that cause the wireless device to perform the techniques. Additional details of various embodiments are set forth in the accompanying drawings and the description below. Other features, objects and advantages will become apparent from the description and drawings, and from the claims

DETAILED DESCRIPTION OF THE INVENTION

Figure 2:
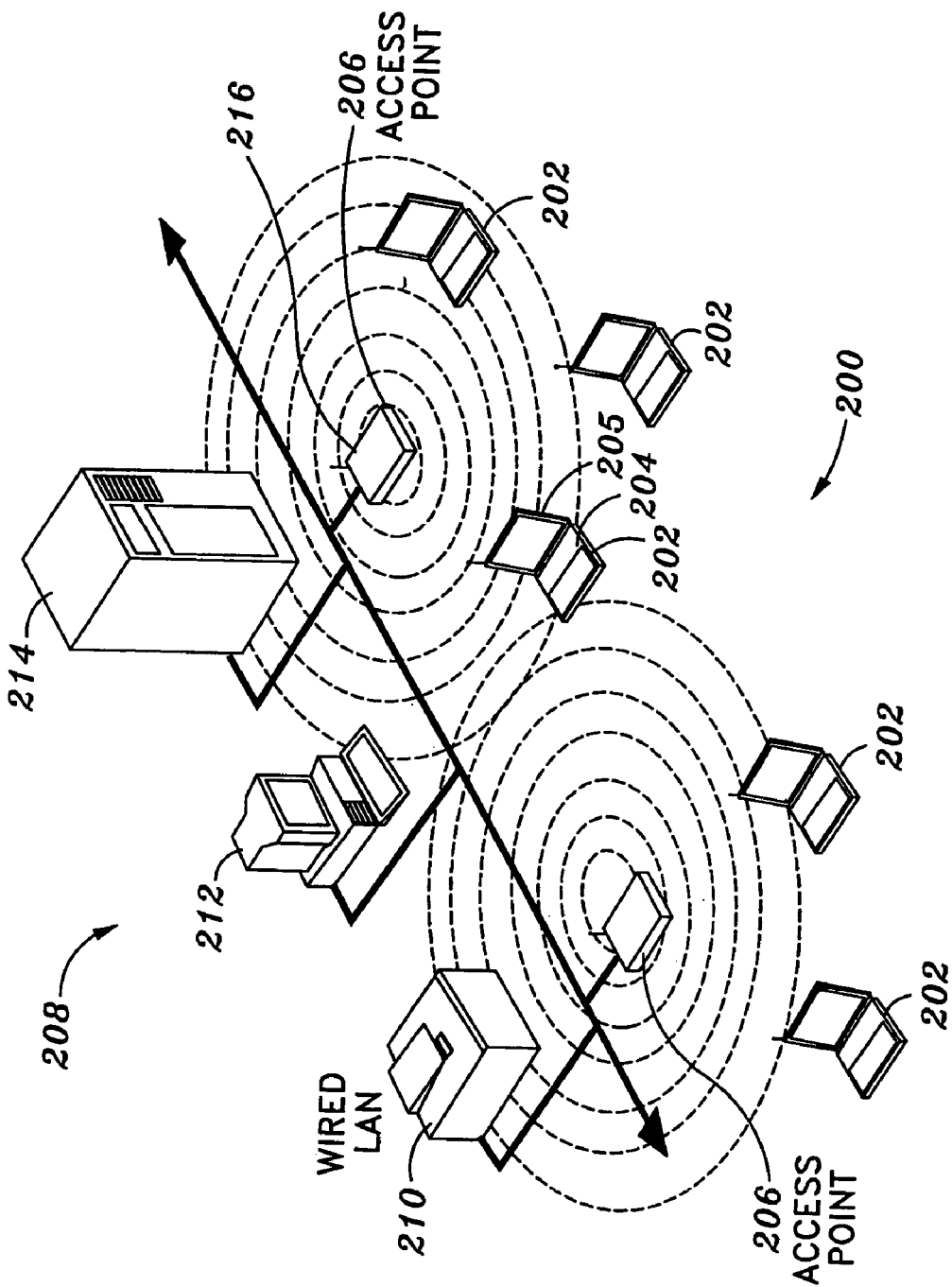
FIG. 2 is a diagram of a wireless LAN, having access to a wired LAN, in accordance with an embodiment of the present invention.

One example of wireless communication devices that could benefit from the application of an embodiment the present invention is wireless local area network (LAN) communication devices that may typically be found in laptop computers, cell phones, portable modems, or personal digital assistants (PDAs), where they are used for communication in a wireless LAN subject to the IEEE 802.11a, 802.11b or 802.11g standard or for communication with a wired LAN through an access point subject to the IEEE 802.11a, 802.11b or 802.11g standard. For example, FIG. 2 shows a wireless LAN 200 comprising wireless communication devices 202, where at least one of the wireless communication devices 202, for example, a wireless communication device 204, may include a power amplifier bypass according to an embodiment of the present invention as more fully described below. As illustrated in FIG. 2, the communication device 204 may be included in a laptop computer 205, for example, providing wireless communication between the laptop computer 205 and the wireless LAN 200.

The wireless LAN 200 may operate in ad hoc mode, as described above, so that, for example, the wireless communication devices 202 operate in a peer-to-peer network, without the presence of an access point, or the wireless LAN 200 may be connected through one or more access points 206 to a wired LAN 208. The access points 206, for example, may provide wireless communication according to the IEEE 802.11a, 802.11b or 802.11g standard between the wireless LAN 200 and wired LAN 208. The wired LAN 208 may be used, for example, to connect various devices, such as network printer 210, personal computer 212, and file server 214 as known in the art. The wired LAN 208 may also be used, for example, to connect the various devices, such as network printer 210, personal computer 212, and file server 214, to the access points 206 and thereby to the wireless LAN 200. One or more access points, for example, the access point 216, may include power amplifier bypass in accordance with an embodiment of the present invention.

Certain embodiments of the present invention may operate in accordance to the 802.11 standards, and other embodiments may operate in accordance to other wireless communication standards that support half-duplex mode of operation.

Figure 3:
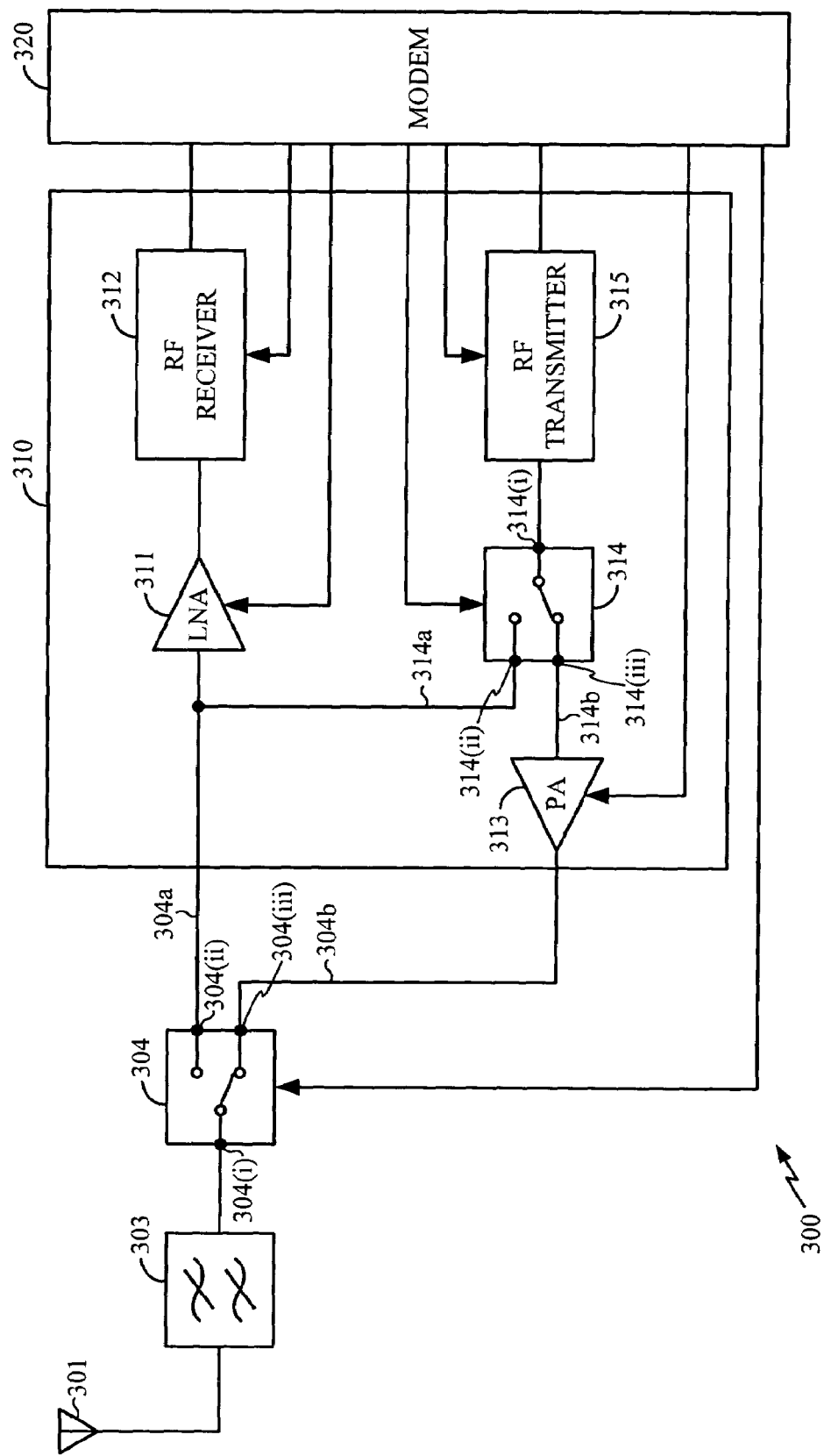
FIG. 3 is a block diagram of an exemplary wireless communication device according to one embodiment of the present invention.

FIG. 3 illustrates a wireless LAN communication device 300 in accordance with an embodiment of the present invention. The communication device 300 operates in accordance to a half-duplex mode of operation. The communication device 300 includes an antenna 301 for receiving and transmitting signals. The antenna 301 is coupled to an RF filter 303 for filtering jammer signals. The RF filter 303 is coupled to a switch 304 that switches between signal paths 304a and 304b. A first terminal 304(i) of the switch 304 is coupled to the RF filter 303, a second terminal 304(ii) is coupled to the signal path 304a, and the third terminal 304(iii) is coupled to the signal path 304b. The switch 304 switches between the second terminal 304(ii) and the third terminal 304(iii) to connect to the first terminal 304(i).

A modem 320 commands the switch 304 to select the signal path 304a when the communication device 300 is receiving a signal. The signal path 304a forms a part of the receiver path used to propagate signals received at the antenna 301 to an RF receiver 312. The switch 304 is coupled to an RF transceiver IC 310 that includes a low noise amplifier (LNA) 311, the RF receiver 312, an RF transmitter 315, a switch 314 and a power amplifier 313. In certain embodiments of the present invention, the power amplifier 313 may be located outside of the RF transceiver IC 310. The received signal is transmitted from the switch 304 to the low noise amplifier (LNA) 311 that amplifies the received signal. The output signal of the LNA 311 is processed by the RF receiver 312. The RF receiver 312 downconverts the received RF signal from the LNA 311 to a baseband signal. The RF receiver 312 also filters out any noise or unnecessary signals. The RF receiver 312 outputs a baseband signal to the modem 320 for further processing. During the receiving mode, the modem 320 turns off the RF transmitter 315 and the power amplifier 313.

When the communication device 300 is transmitting a signal, the modem outputs a baseband signal to the RF transmitter 315. The RF transmitter 315 upconverts the received baseband signal to an RF signal (i.e., a transmitting RF signal). The RF transmitter 315 outputs the transmitting RF signal to a switch 314. A first terminal 314(i) of the switch 314 is coupled to the RF transmitter 315, a second terminal 314(ii) is coupled to a signal path 314a, and the third terminal 314(iii) is coupled to a signal path 314b. The switch 314 switches between the second terminal 314(ii) and the third terminal 314(iii) to connect to the first terminal 314(i). The switch 314 switches between the signal paths 314a and 314b depending on whether the power amplifier 313 is to be bypassed or not. The modem 320 may decide to bypass the power amplifier 313 if the amplification by the power amplifier 313 may create an overly strong signal that may interfere with other signals in the LAN. Such situation may arise if the communication device 300 is too close to an access point. The modem 320 also may decide to bypass the power amplifier 313 if the battery power needs to be conserved.

If the modem 320 decides to bypass the power amplifier 313, the modem 320 commands the switch 314 to select the signal path 314a that is connected to the signal path 304a. Thus, if the power amplifier 313 is bypassed, the signal from the switch 314 travels down the signal path 314a and into the switch 304 through the signal path 304a. Thus, the communication device 300 uses a part of the receiver path (i.e., the signal path 304a ) to bypass the power amplifier 313. The communication device 300 is able to use the signal path 304a to bypass the power amplifier 313 because of the half-duplex mode of operation. The signal from the switch 314 does not proceed into the LNA 311 because the modem 320 turns off the LNA 311 and the RF receiver 312 when the communication device is transmitting a signal. When the LNA 311 is turned off, the input impedance into the LNA 311 is nearly infinite, so the signal from the switch 314 will not travel into the LNA 311. The modem 320 commands the switch 304 to select the signal path 304a when the power amplifier 313 is to be bypassed. The signal is then transmitted to the RF filter 303 and then to the antenna 301 for transmission.

If the modem 320 decides not to bypass the power amplifier 313, the switch 314 selects the signal path 314b, and the signal from the RF transmitter 315 is received by the power amplifier 313 that amplifies the signal in accordance with a command from the modem 320. The output of the power amplifier 313 is received by the switch 304 that selects the signal path 304b to receive the signal from the power amplifier 313. The signal is then propagated to the antenna 301 through the RF filter 303, as explained above.

Figure 1:
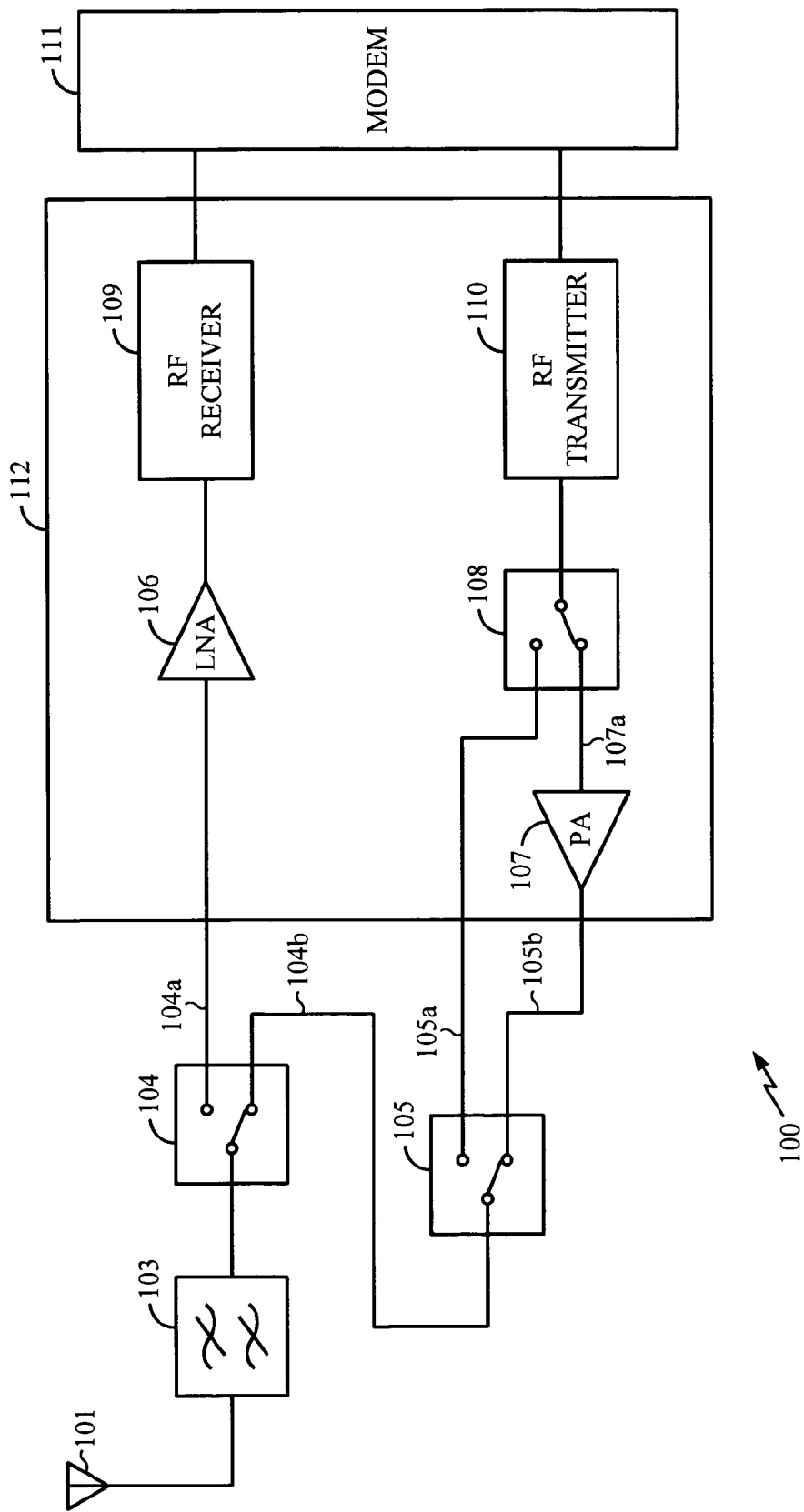
FIG. 1 is a block diagram of one example of a wireless communication device that operates in half-duplex mode.

The above structure allows the communication device 300 to bypass a power amplifier with one less switch than the structure shown in FIG. 1. The communication device 300 uses the switches 314 and 304 to bypass the power amplifier 313 and does not require another additional switch outside of the RF transceiver 310 to bypass the power amplifier 313. By using one less switch than the structure shown in FIG. 1, the communication device 300 uses less board space and saves costs.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

I claim:

1. A communication device comprising:
   a modem for controlling operations of the communication device;
   an RF transmitter coupled to the modem for converting a baseband signal from the modem to a transmitting RF signal;
   a first switch for receiving and directing the transmitting RF signal from the RF transmitter, the first switch having a first terminal coupled to the RF transmitter, a second terminal, and a third terminal coupled to a receiver signal path, and the first switch switching between the second terminal and the third terminal to connect to the first terminal; and
   an amplifier having an input coupled to the second terminal of the first switch for amplifying the transmitting RF signal,
   wherein the modem sends a command to the first switch to switch to the third terminal to allow the transmitting RF signal to bypass the amplifier.

2. The communication device of claim 1, further comprising:
   an antenna for transmitting or receiving signals; and
   a second switch for directing received signals having a first terminal coupled to the antenna, a second terminal coupled to the receiver signal path and a third terminal coupled to an output of the amplifier, the second switch switching between the second terminal and the third terminal to connect to the first terminal.

3. The communication device of claim 2, wherein the modem sends a command to the second switch to switch to the second terminal if the modem determines to bypass the amplifier.

4. The communication device of claim 2, wherein the modem sends a command to the second switch to switch to the third terminal if the modem determines to amplify the transmitting RF signal by using the amplifier.

5. The communication device of claim 2, further comprising an RF receiver coupled to the modem for converting a received RF signal to a baseband signal to be transmitted to the modem.

6. The communication device of claim 5, wherein the RF receiver has an input coupled to the receiver signal path.

7. The communication device of claim 6, wherein the modem sends a command to the second switch to switch to the second terminal when the RF receiver is receiving a signal from the antenna.

8. The communication device of claim 2, further comprising:
   an RF filter coupled to the antenna and the second switch for filtering out jammer signals.

9. The communication device of claim 1, wherein the communication device operates in accordance to an 802.11a, 802.11b or 802.11g standard.

10. The communication device of claim 5, wherein the communication device provides half-duplex operation of the RF transmitter and the RF receiver.

11. The communication device of claim 1, wherein the modem determines to bypass the amplifier if a signal amplified by the amplifier may interfere with signals produced by other communication devices.

12. A communication device comprising:
    a controlling means for controlling operations of the communication device;
    an RF transmitting means coupled to the controlling means for converting a baseband signal from the controlling means to a transmitting RF signal;
    a first switch means for receiving and directing the transmitting RF signal from the RF transmitting means, the first switch means having a first terminal coupled to the RF transmitting means, a second terminal, and a third terminal coupled to a receiver signal path, and the first switch means switching between the second terminal and the third terminal to connect to the first terminal; and
    an amplifying means having an input coupled to the second terminal of the first switch means for amplifying the transmitting RF signal,
    wherein the controlling means sends a command to the first switch means to switch to the third terminal to allow the transmitting RF signal to bypass the amplifying means.

13. The communication device of claim 12, further comprising:
    an antenna means for transmitting or receiving signals; and
    a second switch means for directing received signals having a first terminal coupled to the antenna means, a second terminal coupled to the receiver signal path and a third terminal coupled to an output of the amplifying means, the second switch means switching between the second terminal and the third terminal to connect to the first terminal.

14. The communication device of claim 13, wherein the controlling means sends a command to the second switch means to switch to the second terminal if the controlling means determines to bypass the amplifying means.

15. The communication device of claim 13, wherein the controlling means sends a command to the second switch means to switch to the third terminal if the controlling means determines to amplify the transmitting RF signal by using the amplifying means.

16. The communication device of claim 13, further comprising an RF receiver means for converting a received RF signal to a baseband signal to be transmitted to the controlling means.

17. The communication device of claim 16, wherein the RF receiver means has an input coupled to the receiver signal path.

18. The communication device of claim 17, wherein the controlling means sends a command to the second switch means to switch to the second terminal when the RF receiver means is receiving a signal from the antenna means.

19. The communication device of claim 13, further comprising:
an RF filter means coupled to the antenna means and the second switch means for filtering out jammer signals.

20. The communication device of claim 12, wherein the communication device operates in accordance to an 802.11a, 802.11b or 802.11g standard.

21. The communication device of claim 16, wherein the communication device provides half-duplex operation of the RF transmitter means and the RF receiver means.

22. The communication device of claim 12, wherein the controlling means determines to bypass the amplifying means if a signal amplified by the amplifying means may interfere with signals produced by other communication devices.

23. A communication device comprising:
a modem for controlling operations of the communication device;
an RF transmitter coupled to the modem for converting a baseband signal from the modem to a transmitting RF signal;
a first switch for receiving and directing the transmitting RF signal from the RF transmitter, the first switch having a first terminal coupled to the RF transmitter, a second terminal and a third terminal coupled to a receiver signal path, and the first switch switching between the second terminal and the third terminal to connect to the first terminal;
an amplifier having an input coupled to the second terminal of the first switch for amplifying the transmitting RF signal;
an antenna for transmitting or receiving signals;
a second switch having a first terminal coupled to the antenna, a second terminal coupled to the receiver signal path and a third terminal coupled to an output of the amplifier, the second switch switching between the second terminal and the third terminal to connect to the first terminal
wherein the modem sends a first command to the first switch to switch to the third terminal and sends a second command to the second switch to switch to the second terminal if the modem determines to allow the transmitting RF signal to bypass the amplifier.

24. The communication device of claim 23, wherein the modem sends a command to the second switch to switch to the third terminal if the modem determines to amplify the transmitting RF signal by using the amplifier.

25. The communication device of claim 23, further comprising an RF receiver for converting a received RF signal to a baseband signal to be transmitted to the modem.

26. The communication device of claim 25, wherein the RF receiver has an input coupled to the receiver signal path.

27. The communication device of claim 26, wherein the modem sends a third command to the second switch to switch to the second terminal when the RF receiver is receiving a signal from the antenna.

28. The communication device of claim 23, further comprising:
an RF filter coupled to the antenna and the second switch for filtering out jammer signals.

29. The communication device of claim 23, wherein the communication device operates in accordance to an 802.11a, 802.11b or 802.11g standard.

30. The communication device of claim 25, wherein the communication device provides a half-duplex operation of the RF transmitter and the RF receiver.

31. The communication device of claim 23, wherein the modem determines to bypass the amplifier if a signal amplified by the amplifier may interfere with signals produced by other communicating devices.

32. An RF transceiver comprising:
a receiver signal path used to receive an RF input signal;
an RF receiver coupled to the receiver signal path for converting the received RF input signal to a baseband signal;
an RF transmitter for converting a received input baseband signal to a transmitting RF signal;
a switch for receiving and directing the transmitting RF signal, the switch having a first terminal coupled to the RF transmitter, a second terminal coupled to the receiver signal path and a third terminal, and the switch switching between the second terminal and the third terminal to connect to the first terminal;
a transmitter signal path used to transmit the transmitting RF signal, the transmitter signal path coupled to the third terminal of the switch,
wherein the switch switches to the second terminal to direct the transmitting RF signal to the receiver signal path in response to a first command.

33. The RF transceiver of claim 32, further comprising an amplifier for amplifying the transmitting RF signal, the amplifier having an input coupled to the transmitter signal path.

34. The RF transceiver of claim 33, wherein the first command allows the transmitting RF signal to bypass the amplifier.

35. The RF transceiver of claim 33, wherein the switch switches to the third terminal to direct the transmitting RF signal to the amplifier in response to a second command.

36. The RF transceiver of claim 35, wherein the second command allows the transmitting RF signal to be amplified by the amplifier.

* * * * *